United States Patent
Shirakawa

(10) Patent No.: US 9,066,023 B2
(45) Date of Patent: Jun. 23, 2015

(54) IMAGE SENSING APPARATUS, COMMUNICATION APPARATUS, AND CONTROL METHOD OF THESE APPARATUSES

(75) Inventor: Yusuke Shirakawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 793 days.

(21) Appl. No.: 13/020,087

(22) Filed: Feb. 3, 2011

(65) Prior Publication Data

US 2011/0205380 A1    Aug. 25, 2011

(30) Foreign Application Priority Data

Feb. 19, 2010 (JP) .................................. 2010-035427

(51) Int. Cl.
*H04N 5/247* (2006.01)
*H04N 5/232* (2006.01)

(52) U.S. Cl.
CPC .............. *H04N 5/247* (2013.01); *H04N 5/232* (2013.01)

(58) Field of Classification Search
CPC .............. H04N 5/232; H04N 5/23203; H04N 5/23206; H04N 5/2259; H04N 5/247; H04N 7/1801; H04N 2201/0084; G08B 13/19645
See application file for complete search history.

(56) References Cited

U.S. PATENT DOCUMENTS

| 6,188,431 | B1* | 2/2001 | Oie ............................. 348/211.5 |
| 7,046,292 | B2* | 5/2006 | Ziemkowski ................. 348/371 |
| 7,460,781 | B2* | 12/2008 | Kanai et al. .................... 396/263 |
| 7,511,737 | B2* | 3/2009 | Singh .......................... 348/211.3 |
| 7,623,778 | B2* | 11/2009 | Fujimoto ......................... 396/57 |
| 2010/0157020 | A1* | 6/2010 | Choi et al. ....................... 348/47 |

FOREIGN PATENT DOCUMENTS

JP         2005-130030 A    5/2005

* cited by examiner

*Primary Examiner* — Luong T Nguyen
(74) *Attorney, Agent, or Firm* — Fitzpatrick, Cella, Harper & Scinto

(57) ABSTRACT

In an image sensing system in which a master camera and a slave camera are communicatably connected, the master camera acquires delay time information of the slave camera, indicative of delay time from the moment of reception of an exposure-start instruction signal to the moment of a start of exposure of the slave camera, and based on the acquired delay time information, controls at least one of the exposure-start timing of the master camera and the transmission timing for transmitting the exposure-start instruction signal to the slave camera.

12 Claims, 9 Drawing Sheets

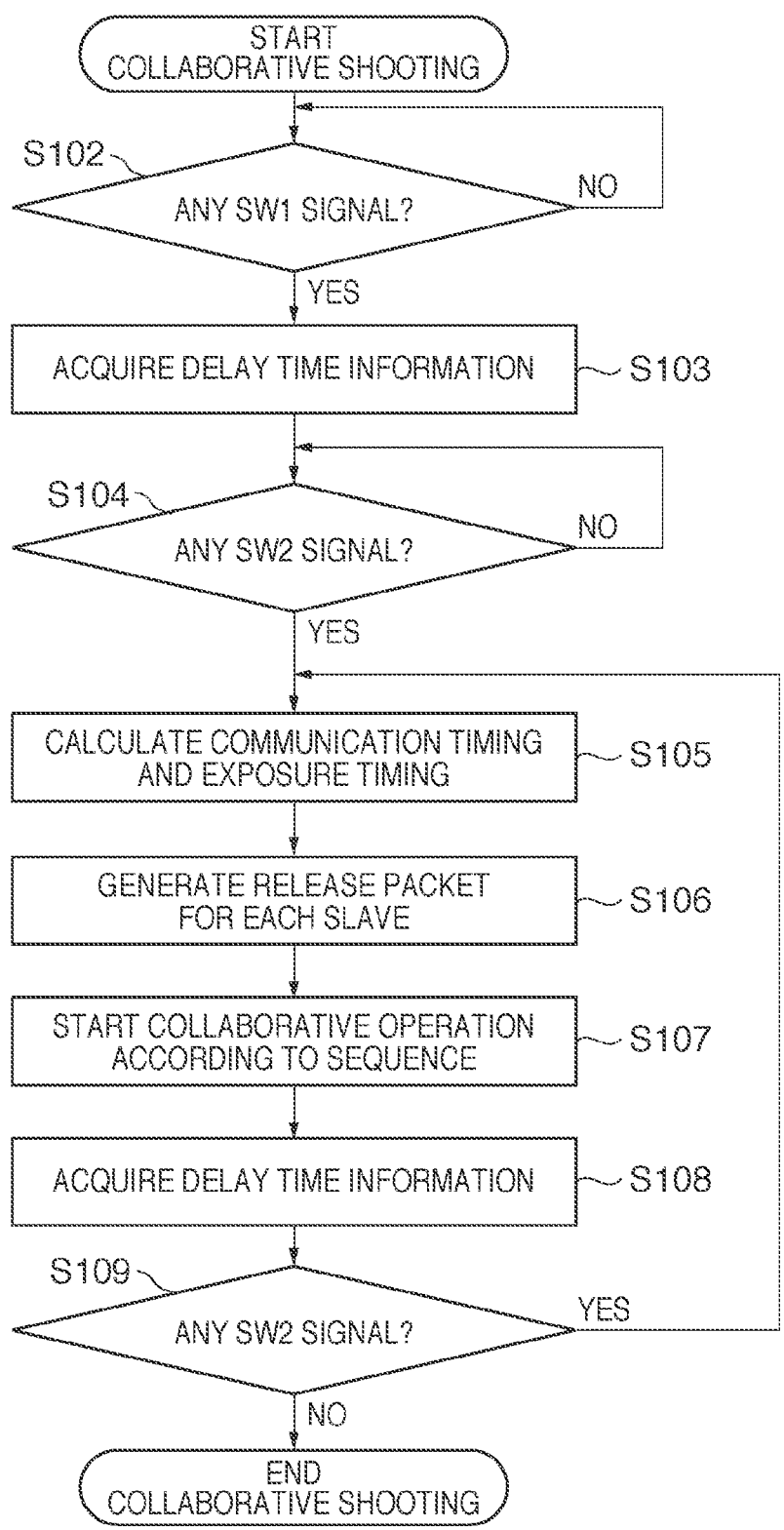

FIG. 5A

| HEADER | TRANSMISSION DESTINATION INFORMATION | RELEASE COMMAND |

FIG. 5B

| HEADER | TRANSMISSION DESTINATION INFORMATION | RELEASE COMMAND | EXPOSURE TIMING INFORMATION |

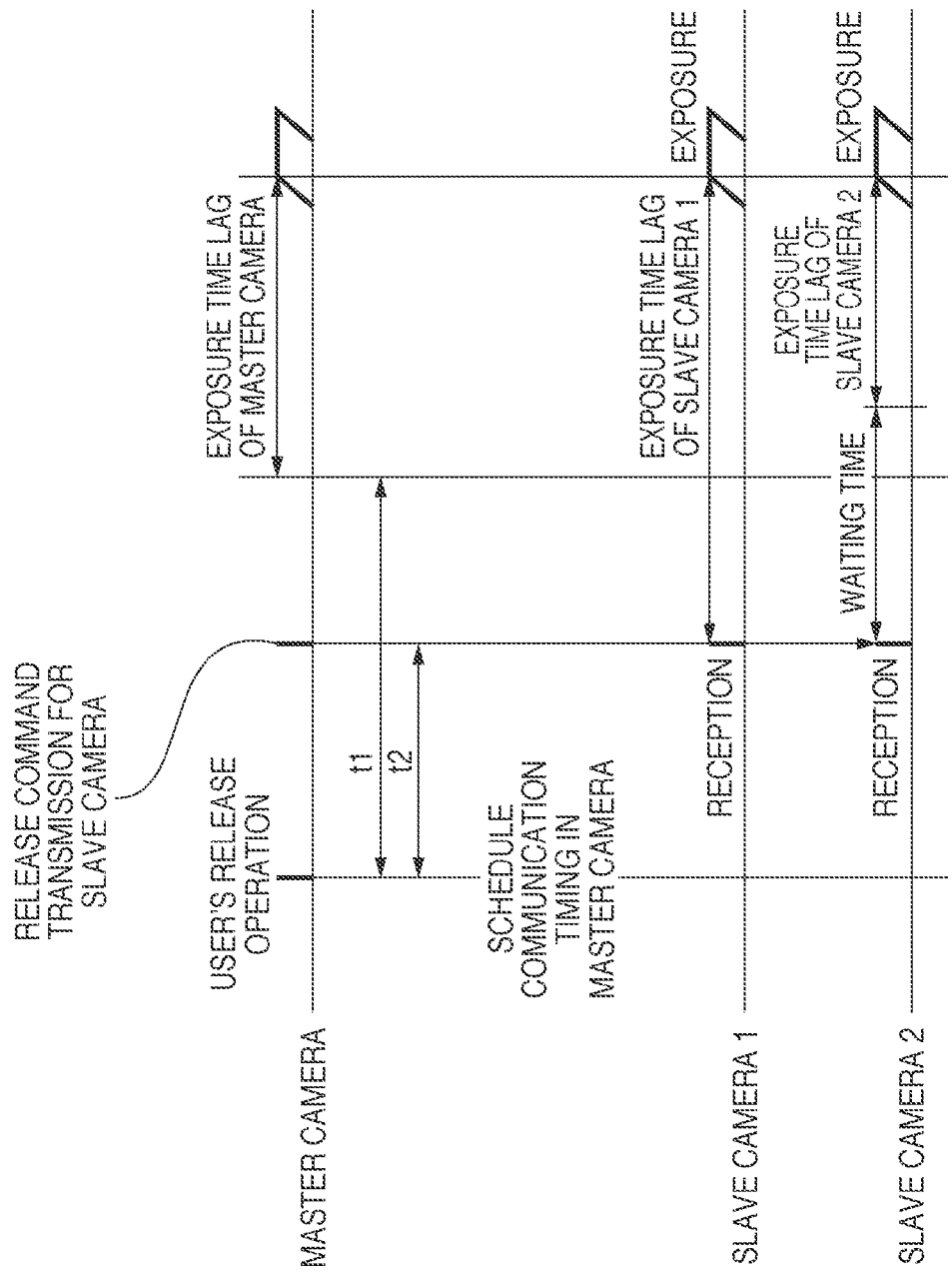

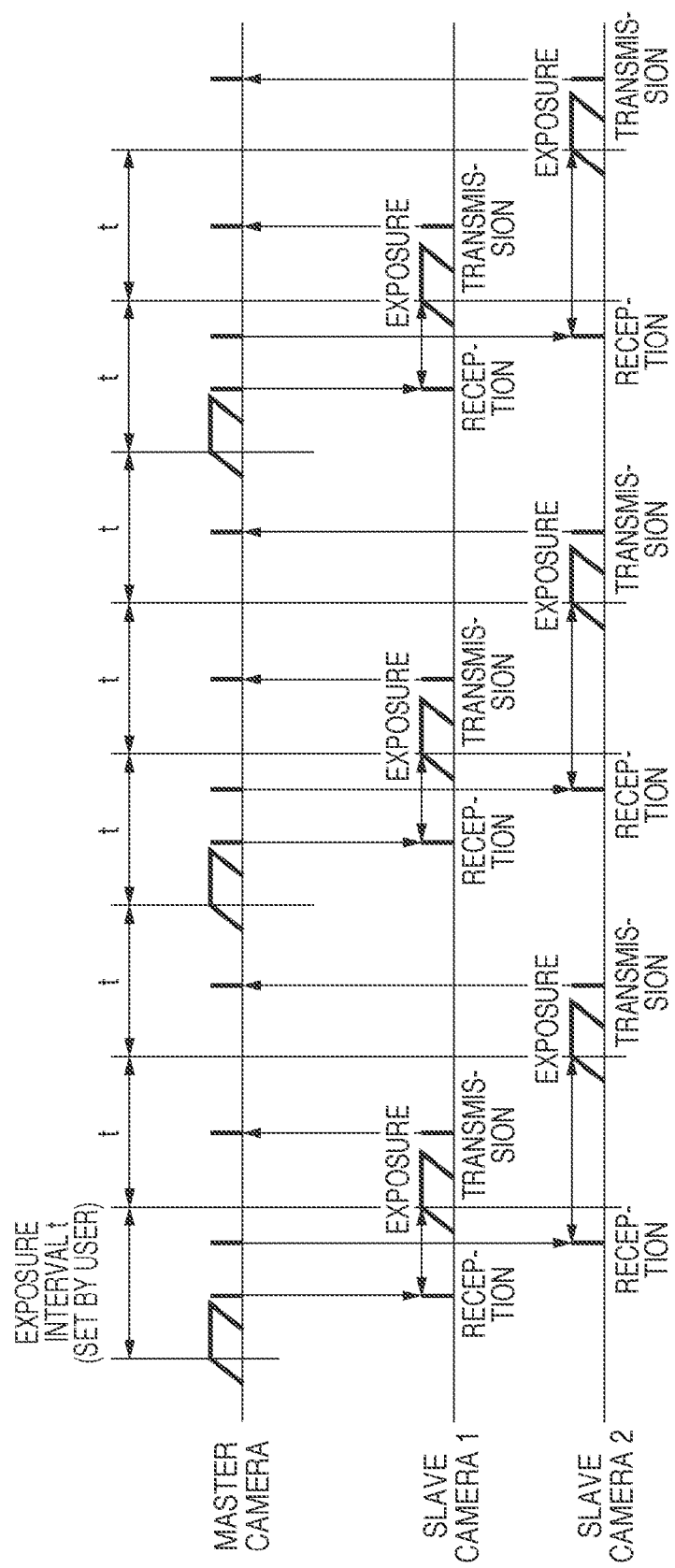

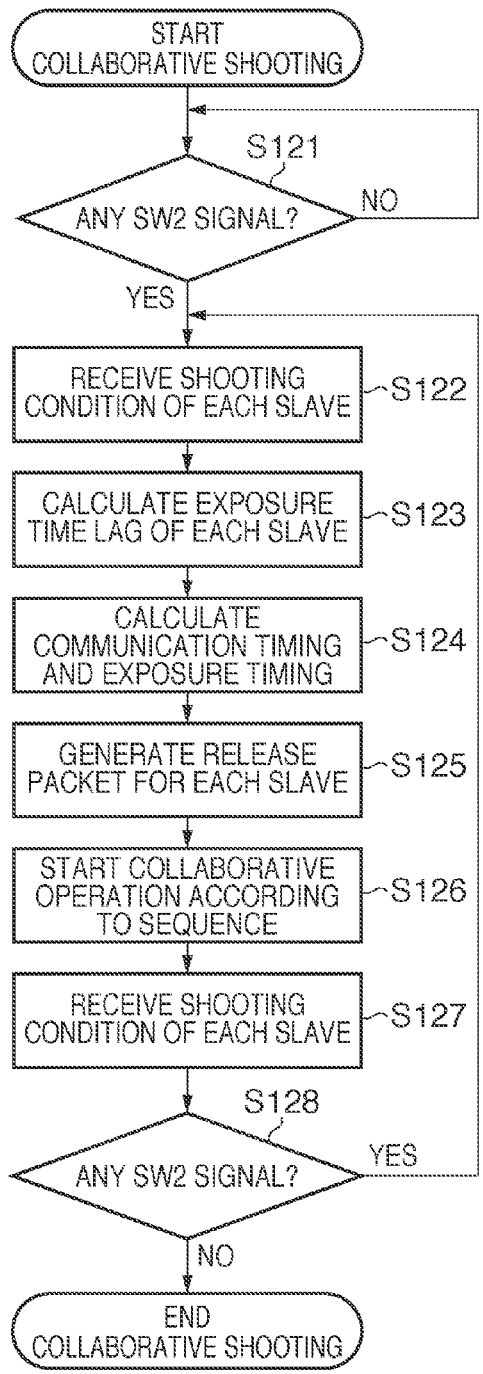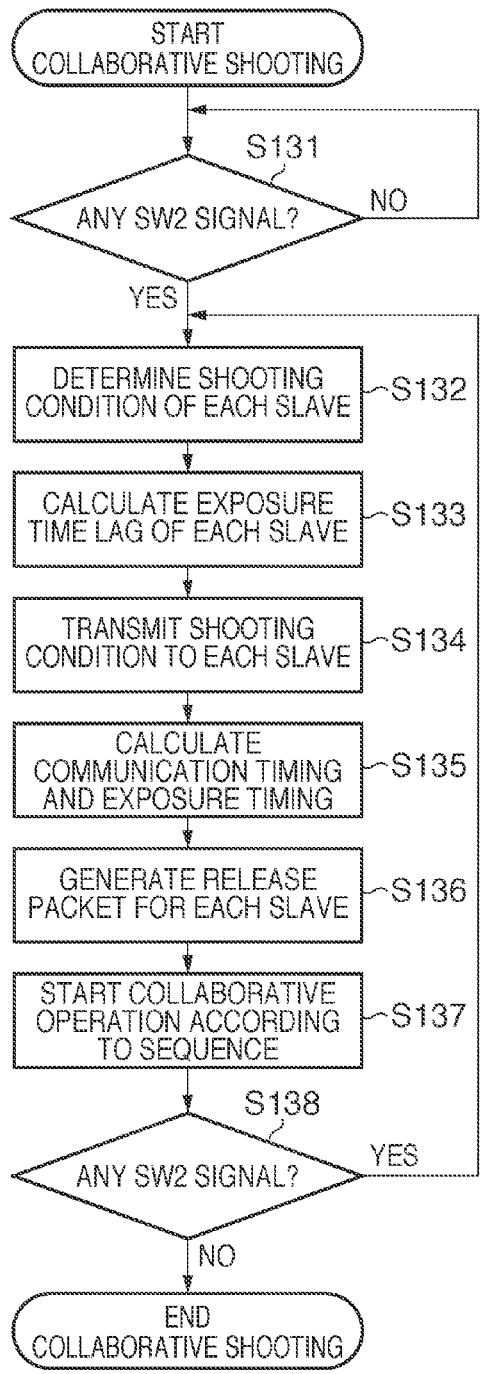

IMAGE SENSING APPARATUS, COMMUNICATION APPARATUS, AND CONTROL METHOD OF THESE APPARATUSES

BACKGROUND OF THE INVENTION

1. Field of the Invention

The present invention relates to an image sensing system, in which a plurality of cameras are communicably (hereinafter also referred to as "communicatably") connected.

2. Description of the Related Art

In an image sensing system in which a plurality of cameras are connected through a linking device, such as a wireless LAN, for performing a collaborative operation, conventionally available is a system in which a master camera controls a release operation of a slave camera. For instance, Japanese Patent Laid-Open No. 2005-130030 discloses the following system. More specifically, a master mobile telephone transmits shooting time information to a slave mobile telephone, and the slave side executes a release operation in accordance with the received shooting time information. In this system, delay time from the moment the master side transmits a pseudo trigger signal to the slave side to the moment the master side receives an ACK signal transmitted from the slave side is regularly monitored, and the shooting time information is determined based on the delay time.

However, the system according to Japanese Patent Laid-Open No. 2005-130030 only gives consideration to the delay time, which is caused by communication between the master side and the slave side, and does not consider delay time from trigger signal reception to a start of a release operation in the slave side. For this reason, proper control cannot be performed in accordance with a type and conditions of the slave camera. Therefore, exposure timing of the master camera and the slave camera cannot strictly be controlled.

Accordingly, it has not been able to realize image shooting control, such as accurately synchronizing exposure timing of a master camera with that of a slave camera for shooting an event at the same moment from different angles. Furthermore, sophisticated control, such as performing slave camera's exposure at exact intermediate timing between an exposure end and an exposure start of a master camera's continuous shooting, cannot be realized.

SUMMARY OF THE INVENTION

The present invention has been made in consideration of the aforementioned problems, and realizes, in an image sensing system in which a plurality of cameras are communicatably connected, a technique that enables accurate control of exposure timing of the plurality of cameras.

In order to solve the aforementioned problems, the present invention provides an image sensing apparatus which is communicable (also referred to herein as "communicatable") with another image sensing apparatus, comprising: a transmission unit configured to transmit an instruction signal, which instructs a start of exposure to the another image sensing apparatus; an acquisition unit configured to acquire delay time information of the another image sensing apparatus, indicative of delay time from reception of the instruction signal transmitted by the transmission unit to a start of exposure of the another image sensing apparatus; and a control unit configured to control at least one of exposure-start timing of the image sensing apparatus itself and transmission timing of the instruction signal, which is transmitted by the transmission unit, based on the delay time information acquired by the acquisition unit.

In order to solve the aforementioned problems, the present invention provides an image sensing apparatus which is communicatable with another image sensing apparatus, comprising: a transmission unit configured to transmit an instruction signal, which instructs a start of exposure to the another image sensing apparatus, the instruction signal including information indicative of waiting time for having the another image sensing apparatus wait for a start of an exposure preparation operation after the instruction signal is received; an acquisition unit configured to acquire delay time information of the another image sensing apparatus, indicative of delay time from a start of the exposure preparation operation to a start of exposure of the another image sensing apparatus; and a control unit configured to control the waiting time based on the delay time information acquired by the acquisition unit.

In order to solve the aforementioned problems, the present invention provides an image sensing apparatus which is communicatable with another image sensing apparatus, comprising: a transmission unit configured to transmit an instruction signal, which instructs a start of exposure to the another image sensing apparatus, the instruction signal including information indicative of reference time which serves as a benchmark of the start of exposure; an acquisition unit configured to acquire delay time information of the another image sensing apparatus, indicative of delay time from a start of an exposure preparation operation to the start of exposure of the another image sensing apparatus; and a control unit configured to control the reference time based on the delay time information acquired by the acquisition unit.

In order to solve the aforementioned problems, the present invention provides an image sensing apparatus which is communicatable with another image sensing apparatus, comprising: a reception unit configured to receive an instruction signal, which instructs a start of exposure, from the another image sensing apparatus; a transmission unit configured to transmit delay time information, indicative of delay time from reception of the instruction signal by the reception unit to a start of exposure, to the another image sensing apparatus; and an exposure control unit which causes a start of exposure based on the instruction signal received by the reception unit.

In order to solve the aforementioned problems, the present invention provides an image sensing apparatus which is communicatable with a communication apparatus, comprising: a reception unit configured to receive an instruction signal, which instructs a start of exposure, from the communication apparatus; a transmission unit configured to transmit delay time information, indicative of delay time from reception of the instruction signal by the reception unit to a start of exposure, to the communication apparatus; and an exposure control unit which causes a start of exposure based on the instruction signal received by the reception unit.

In order to solve the aforementioned problems, the present invention provides a communication apparatus which is communicatable with a plurality of image sensing apparatuses, comprising: a transmission unit configured to transmit an instruction signal, which instructs a start of exposure to the plurality of image sensing apparatuses; an acquisition unit configured to acquire delay time information of the plurality of image sensing apparatuses, indicative of delay time from reception of the instruction signal transmitted by the transmission unit to a start of exposure of the plurality of image sensing apparatuses; and a control unit configured to control transmission timing of the instruction signal, which is transmitted to the plurality of image sensing apparatuses by the transmission unit, based on the delay time information acquired by the acquisition unit.

In order to solve the aforementioned problems, the present invention provides a communication apparatus which is communicatable with a plurality of image sensing apparatuses, comprising: a transmission unit configured to transmit an instruction signal, which instructs a start of exposure to the plurality of image sensing apparatuses, the instruction signal including information indicative of waiting time for having the plurality of image sensing apparatuses wait for a start of an exposure preparation operation after the instruction signal is received; an acquisition unit configured to acquire delay time information of the plurality of image sensing apparatuses, indicative of delay time from a start of the exposure preparation operation to a start of exposure of the plurality of image sensing apparatuses; and a control unit configured to control the waiting time based on the delay time information acquired by the acquisition unit.

In order to solve the aforementioned problems, the present invention provides a communication apparatus which is communicatable with a plurality of image sensing apparatuses, comprising: a transmission unit configured to transmit an instruction signal, which instructs a start of exposure to the plurality of image sensing apparatuses, the instruction signal including information indicative of reference time which serves as a benchmark of the start of exposure; an acquisition unit configured to acquire delay time information of the plurality of image sensing apparatuses, indicative of delay time from a start of an exposure preparation operation to the start of exposure of the plurality of image sensing apparatuses; and a control unit configured to control the reference time based on the delay time information acquired by the acquisition unit.

In order to solve the aforementioned problems, the present invention provides a control method of an image sensing apparatus which is communicatable with another image sensing apparatus, comprising: a transmission step of transmitting an instruction signal, which instructs a start of exposure to the another image sensing apparatus; an acquisition step of acquiring delay time information of the another image sensing apparatus, indicative of delay time from reception of the instruction signal transmitted in the transmission step to a start of exposure of the another image sensing apparatus; and a control step of controlling at least one of exposure-start timing of the image sensing apparatus itself and transmission timing of the instruction signal, which is transmitted in the transmission step, based on the delay time information acquired in the acquisition step.

In order to solve the aforementioned problems, the present invention provides a control method of an image sensing apparatus which is communicatable with another image sensing apparatus, comprising: a transmission step of transmitting an instruction signal, which instructs a start of exposure to the another image sensing apparatus, the instruction signal including information indicative of waiting time for having the another image sensing apparatus wait for a start of an exposure preparation operation after the instruction signal is received; an acquisition step of acquiring delay time information of the another image sensing apparatus, indicative of delay time from a start of the exposure preparation operation to a start of exposure of the another image sensing apparatus; and a control step of controlling the waiting time based on the delay time information acquired in the acquisition step.

In order to solve the aforementioned problems, the present invention provides a control method of an image sensing apparatus which is communicatable with another image sensing apparatus, comprising: a transmission step of transmitting an instruction signal, which instructs a start of exposure to the another image sensing apparatus, the instruction signal including information indicative of reference time which serves as a benchmark of the start of exposure; an acquisition step of acquiring delay time information of the another image sensing apparatus, indicative of delay time from a start of an exposure preparation operation to the start of exposure of the another image sensing apparatus; and a control step of controlling the reference time based on the delay time information acquired in the acquisition step.

In order to solve the aforementioned problems, the present invention provides a control method of a communication apparatus which is communicatable with a plurality of image sensing apparatuses, comprising: a transmission step of transmitting an instruction signal, which instructs a start of exposure to the plurality of image sensing apparatuses; an acquisition step of acquiring delay time information of the plurality of image sensing apparatuses, indicative of delay time from reception of the instruction signal transmitted in the transmission step to a start of exposure of the plurality of image sensing apparatuses; and a control step of controlling transmission timing of the instruction signal, which is transmitted to the plurality of image sensing apparatuses in the transmission step, based on the delay time information acquired in the acquisition step.

In order to solve the aforementioned problems, the present invention provides a control method of a communication apparatus which is communicatable with a plurality of image sensing apparatuses, comprising: a transmission step of transmitting an instruction signal, which instructs a start of exposure to the plurality of image sensing apparatuses, the instruction signal including information indicative of waiting time for having the plurality of image sensing apparatuses wait for a start of an exposure preparation operation after the instruction signal is received; an acquisition step of acquiring delay time information of the plurality of image sensing apparatuses, indicative of delay time from a start of the exposure preparation operation to a start of exposure of the plurality of image sensing apparatuses; and a control step of controlling the waiting time based on the delay time information acquired in the acquisition step.

In order to solve the aforementioned problems, the present invention provides a control method of a communication apparatus which is communicatable with a plurality of image sensing apparatuses, comprising: a transmission step of transmitting an instruction signal, which instructs a start of exposure to the plurality of image sensing apparatuses, the instruction signal including information indicative of reference time which serves as a benchmark of the start of exposure; an acquisition step of acquiring delay time information of the plurality of image sensing apparatuses, indicative of delay time from a start of an exposure preparation operation to the start of exposure of the plurality of image sensing apparatuses; and a control step of controlling the reference time based on the delay time information acquired in the acquisition step.

According to the present invention, in an image sensing system in which a plurality of cameras are communicatably connected, it is possible to accurately control exposure timing of the plurality of cameras.

Further features of the present invention will become apparent from the following description of exemplary embodiments with reference to the attached drawings.

BRIEF DESCRIPTION OF THE DRAWINGS

FIG. 2 is a flowchart which exemplifies a master camera's shooting operation according to an embodiment of the present invention;

FIGS. 5A and 5B are views which exemplify a packet configuration of a release command which is transmitted by a master camera;

FIG. 6 is a timing chart which exemplifies a collaborative shooting operation between a master camera and slave cameras in a synchronous shooting mode;

FIG. 8 is a timing chart which exemplifies a collaborative shooting operation according to a second embodiment of the present invention; and FIGS. 9A and 9B are flowcharts which exemplify a collaborative shooting operation according to a third embodiment of the present invention.

DESCRIPTION OF THE EMBODIMENTS

Embodiments of the present invention will be described in detail below with reference to the accompanying drawings.

The following embodiments are merely examples for practicing the present invention. The embodiments should be properly modified or changed depending on various conditions and the structure of an apparatus to which the present invention is applied. The present invention should not be limited to the following embodiments.

[First Embodiment]

Described hereinafter is an image sensing system according to the present invention, which comprises a master camera and one or more slave cameras. Note that, in the image sensing system, a master camera indicates a camera which transmits an exposure start instruction signal, which will be described later, to another camera, while a slave camera indicates a camera which receives the exposure start instruction signal transmitted by the master camera. Further, although the present embodiment provides an example in which an image sensing apparatus according to the present invention is applied to a digital single-lens reflex camera, the present invention may be applied to other types of image sensing apparatuses, for instance, compact cameras, digital video cameras, and mobile telephones with a camera.

Furthermore, a master camera and a slave camera do not have a particular difference in the circuit structure, which will be described later, and may be configured in a way that each camera is operable as a master camera or a slave camera in accordance with the user setting. In other words, even if a master camera and a slave camera are switched in a shooting operation sequence which will be described later, the camera is operable as a switched camera. Moreover, the present invention can be realized even in a case where a master camera and one or more slave cameras are different types of cameras.

<Camera Configuration>

Figure 1:
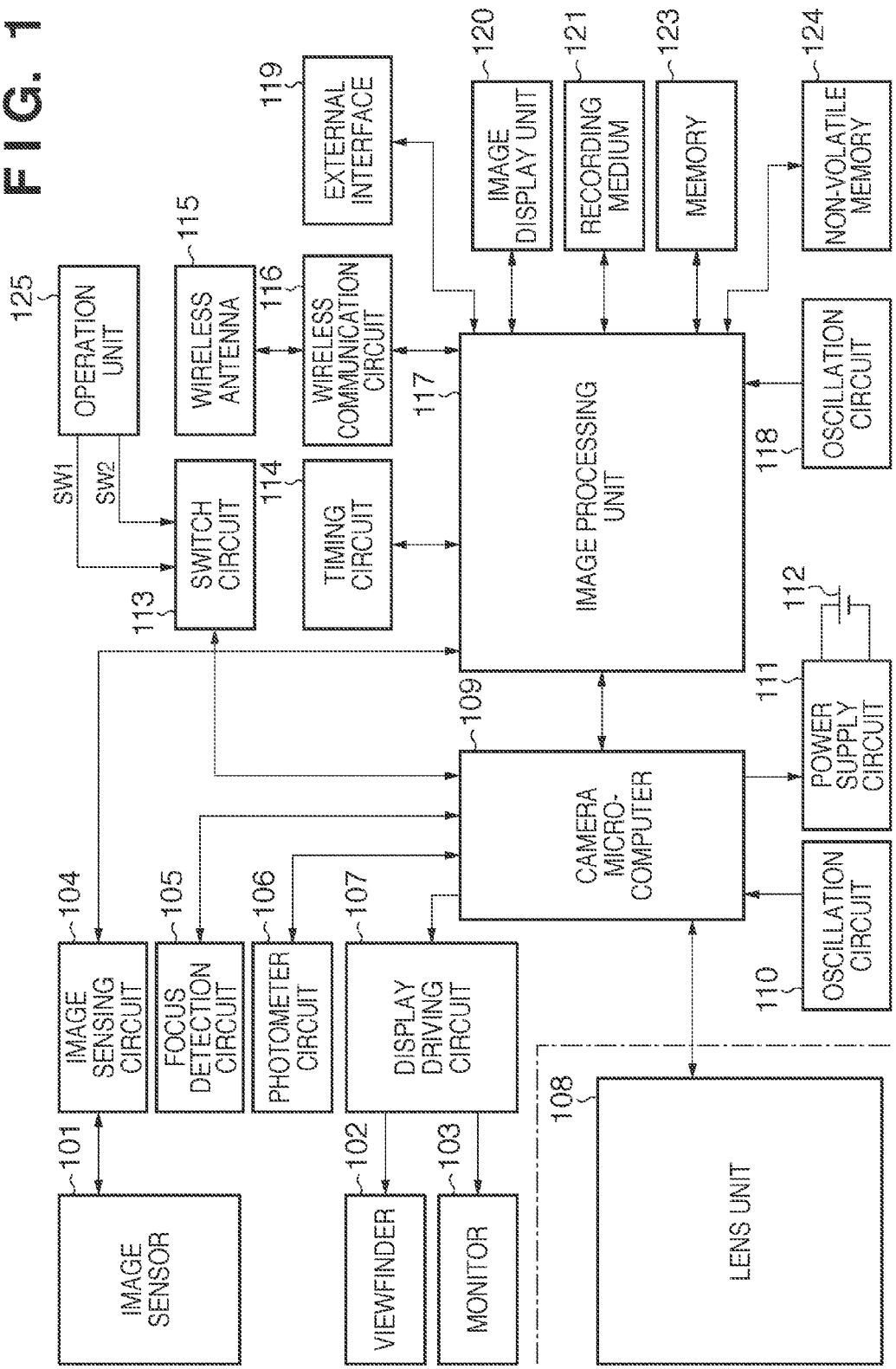
FIG. 1 is a block diagram which exemplifies a camera configuration according to an embodiment of the present invention.

Next, a camera configuration according to the present embodiment is described with reference to FIG. 1. In FIG. 1, an image sensor 101, which comprises an image sensing element, such as a CCD, a CMOS or the like, photoelectrically converts an object's optical image and generates electric signals. An image sensing circuit 104 controls driving of the image sensor 101 for a charge-storage operation and a charge-reading operation. A focus detection circuit 105 detects an object's defocus amount. A photometer circuit 106 measures object's luminance.

A display driving circuit 107 drives a viewfinder 102 having an LCD and so on, and a monitor 103. The viewfinder 102 and monitor 103 display an operation state, messages or the like using texts, images, audio or the like in accordance with a program which is executed by a camera microcomputer 109.

A lens unit 108 is an interchangeable lens that can be attached or detached. A camera microcomputer 109 controls the lens unit 108 in accordance with detection results of the focus detection circuit 105 and photometer circuit 106 for realizing autofocus (AF) and auto exposure (AE) processing.

An oscillation circuit 110 supplies clock signals to the camera microcomputer 109. A power supply circuit 111 controls power supply from a power source 112 to the camera microcomputer 109.

A switch circuit 113 outputs an operation signal of an operation unit 125 to the camera microcomputer 109. The operation unit 125, which serves as a user's operation device for giving various operation instructions to the camera microcomputer 109, is configured with, for instance, a switch, a dial, a touch panel and the like. The operation unit 125 includes release switches SW1 and SW2. The release switch SW1, which is turned on by pressing a shutter button (not shown) halfway (half stroke), instructs a start of an image shooting preparation operation, such as autofocus (AF), auto exposure (AE), and auto white balance (AWB) processing. The release switch SW2, which is turned on by pressing the shutter button all the way (full stroke), instructs a start of an image shooting operation including exposure processing, such as writing image data in a memory 123, which has been read from the image sensor 101 and generated by an image processing unit 117.

The camera microcomputer 109 comprises a CPU and a memory, in which a program or the like for having the camera microcomputer 109 execute various processing is stored.

The image processing unit 117, which is controlled by the camera microcomputer 109, converts an analogue electric signal which is outputted by the image sensor 101 to a digital signal. Furthermore, the image processing unit 117 performs necessary image processing, such as outline compensation, gamma correction, white balance correction or the like, on digital image data, and generates an image file.

A timing circuit 114 performs a time keeping operation of communication timing and exposure-start timing, which will be described later, and outputs an interruption signal to the camera microcomputer 109 when each set timing comes.

A wireless communication circuit 116 performs communication with another camera through a wireless antenna 115. Further, the wireless communication circuit 116 executes processing necessary for wireless communication, such as data format conversion for communication, and receives or transmits various data through the wireless antenna 115. For wire communication, a wire communication circuit is separately provided to execute necessary communication processing. An oscillation circuit 118 supplies clock signals to the image processing unit 117.

An external interface 119 is provided for connecting an external interface, such as a USB, to the image processing unit 117. An image display unit 120, comprising a TFT-LCD or the like, sequentially displays images sensed by the image sensor 101, thereby realizing an electronic viewfinder function. Furthermore, the image display unit 120 also has an image replay function for reading an image file out of a recording medium 121 and replaying an image.

A recording medium 121 is, for instance, an attachable/detachable memory card for storing an image file, which has been read out of the memory 123 and compressed by the image processing unit 117.

A memory 123, which is configured with DRAM or the like, stores still images or moving images sensed by the image sensor 101. The memory 123 has a storage capacity sufficient for storing a predetermined number of still images or a predetermined time period of moving images, and can store a large amount of images at high speed in a case of continuous shooting, in which a plurality of number of still images are continuously shot. Also, the memory 123 temporarily stores a constant, a variable, a program or the like for operation of the image processing unit 117. A non-volatile memory 124 stores a program or the like, which is executed by the image processing unit 117.

The camera microcomputer 109 controls operation of the overall camera, including the image sensor 101, the viewfinder 102, the monitor 103, the lens unit 108, and the image processing unit 117, in accordance with an input signal from each circuit and a program. In other words, exposure control is performed by controlling the image sensor and the image sensing circuit 104, and transmission control is performed by controlling the wireless communication circuit 116.

In FIG. 1, when a user executes a shutter release operation by, for instance, pressing the shutter button, the camera microcomputer 109 detects a release signal (a SW1 signal and a SW2 signal) through the switch circuit 113. The camera microcomputer 109 drives the lens unit 108 for performing an auto exposure (AE) or autofocus (AF) operation, and drives the image sensor 101 for sensing an object image.

Connected to the camera microcomputer 109 are the wireless communication circuit 116 and the wireless antenna 115 serving as a wireless communication device. When these wireless communication devices establish a link with wireless communication device of a slave camera, a master camera can communicate with a slave camera. Aside from a user's shutter pressing operation, it is also possible to shoot an object image by receiving a release command, which is an exposure start instruction signal, by the wireless communication device. Also when a slave camera receives a release command from a master camera, the lens unit 108 is driven for an AE/AF operation and the image sensor 101 is driven for object image sensing, as similar to the case of release signal reception. The delay time from the moment of release command reception to the moment of an exposure start varies depending on a type of cameras, a type of exchangeable lenses mounted to the camera, a f-stop setting at the time of exposure, and so on. Hereinafter, delay time from the moment of release command reception to the moment of an actual exposure start in a slave camera will be referred to as "exposure time lag." In other words, the exposure time lag varies depending on a type of cameras, a type of exchangeable lenses mounted to the camera, image shooting conditions, and so on.

The present embodiment describes a case where cameras are made communicatable through a wireless LAN. Note that, for the connection, an ad-hoc connection method or an infrastructure connection method through an access point may be used. In addition, a wireless connection method other than a wireless LAN, such as Bluetooth (registered trademark), or a wired connection method using a cable, such as a USB or an Ethernet (registered trademark), may be used.

Figure 3A:
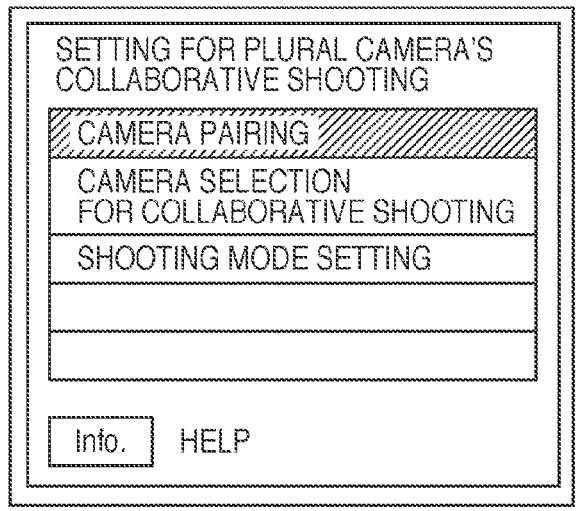
FIGS. 3A to 3C are views which exemplify operation screens for establishing a wireless link by a master camera with a slave camera according to an embodiment of the present invention.
Figure 3B:
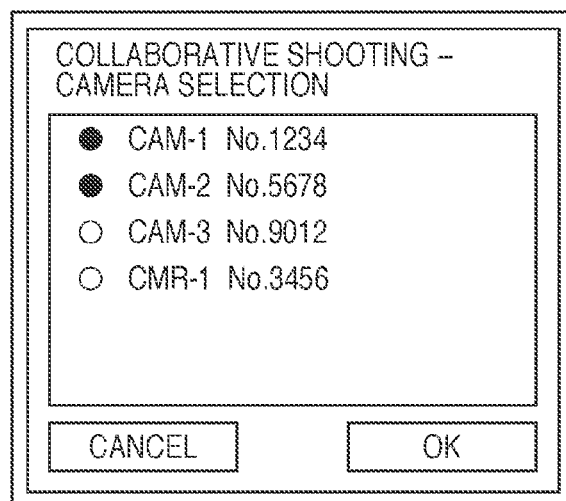
Figure 3C:
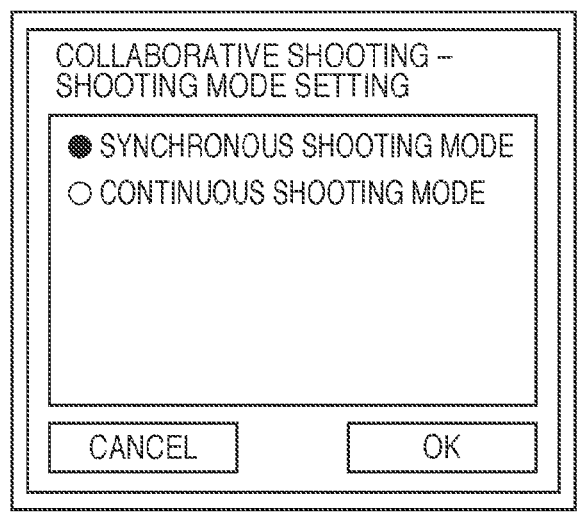

Prior to a collaborative shooting operation, a user must establish a wireless link between a master camera and a slave camera. FIGS. 3A to 3C show an example of a graphical user interface (GUI) for establishing a wireless link. Upon user's operation of a menu button or a set button on a master camera, the screen shifts to the menu selection screen in FIG. 3A, and the user selects the "camera pairing" menu. By performing similar operation on a slave camera, necessary communication for establishing a wireless link between the master camera and the slave camera is performed, and each camera is registered as a communication target. When there are a plurality of slave cameras, this operation is repeated for the number of cameras for registering the plurality of slave cameras as target cameras in the master camera. When a communication target is once registered, the camera becomes communicatable by simply selecting "communicate" or "not communicate" in the next communication.

Next, on the master camera's screen shown in FIG. 3B, a user selects a camera that is to perform collaborative shooting. In this operation, a camera that the user wants to have execute a release operation in conjunction with the master camera's release operation is selected from a plurality of slave cameras, which have already been registered in the master camera. In the drawing, the cameras named "CAM-1 No. 1234" and "CAM-2 No. 5678" are selected by ticking the circle.

Next, as shown in FIG. 3C, a shooting mode for collaborative shooting is set on the master camera's screen. For an example of options, the drawing shows a synchronous shooting mode and a continuous shooting mode.

A synchronous shooting mode is a mode in which a master camera and a plurality of slave cameras start exposure at virtually simultaneous timing. This mode is suitable for shooting an object at same timing by a plurality of cameras. A moment of an event can be captured from different angles. In a case of shooting a person, his/her expression at a moment can be captured from different angles. Therefore, in a case of shooting images in a synchronous shooting mode, it is necessary to strictly control the exposure timing of the plurality of cameras.

A continuous shooting mode is a mode in which a plurality of cameras alternately perform image shooting. For instance, a digital single-lens reflex camera, which is currently widespread, can take about three frames per second in continuous shooting. Therefore, the mode is suitable for performing continuous image shooting corresponding to six frames per second with the use of two cameras, or performing continuous image shooting corresponding to nine frames per second with the use of three cameras. In such continuous image shooting, in order to acquire natural continuous images which seem as if they were taken by one camera, it is necessary to strictly control the exposure timing of the plurality of cameras. To be specific, the cameras must be controlled in a way that the exposure sequence does not go out of order among the plurality of cameras and that the exposure intervals vary as little as possible.

<Collaborative Shooting Operation>

Next, a master camera's collaborative shooting operation is described with reference to the flowchart in FIG. 2. The flowchart in FIG. 2 schematically shows a collaborative shooting operation, and is common in a synchronous shooting mode and a continuous shooting mode. Note that, unless specifically stated otherwise, the following processing is realized by executing control in accordance with an input signal from respective circuits or a program of firmware stored in the non-volatile memory 124 by the camera microcomputer 109 of the master camera. This also applies to other embodiments of the present invention. Furthermore, assume that, by the master camera's operation that has been described with reference to FIGS. 3A to 3C, one or more slave cameras for performing collaborative shooting have already been registered.

In FIG. 2, when a SW1 signal from a user's release switch operation is detected (S102), the master camera acquires delay time information, indicative of delay time from the moment of release command reception to the moment of an actual exposure start of a slave camera, from all the slave cameras which are to perform collaborative shooting (S103). Next, when a SW2 signal is detected in S104, the master camera schedules exposure timing of all the cameras which are to perform collaborative shooting, including the master camera itself, based on the acquired delay time information. Thereafter, the master camera calculates communication timing and exposure timing for transmitting a release command to each of the slave cameras (S105).

Next, the master camera generates a release packet for each slave camera, using the calculation result in S105 (S106). The master camera transmits the release packet in a communication sequence corresponding to the user-set shooting mode, for instance, a synchronous shooting mode or a continuous shooting mode, and the master camera itself starts an exposure sequence, thereby starting collaborative shooting (S107). When exposure of each slave camera ends, the master camera again acquires delay time information from each of the slave cameras (S108) to prepare for the next shooting operation (SW2 signal detection). When a SW2 signal is no longer detected (when predetermined time elapses without detection of a SW2 signal), the collaborative shooting operation ends.

<Collaborative Shooting in Synchronous Shooting Mode>

Next, operational timing for a master camera and slave cameras in a synchronous shooting mode is described with reference to FIG. 4. Herein, the description is provided, assuming that synchronous shooting is performed by a total of three cameras, including one master camera (first image sensing apparatus) and slave cameras 1 and 2 (second and third image sensing apparatuses). Assume that the three cameras have already been registered as communication targets, and have been set in the synchronous shooting mode. Further assume that, in response to a user's release switch operation (detection of a SW1 signal), delay time information of the slave cameras 1 and 2 have been transmitted to the master camera.

Figure 4:
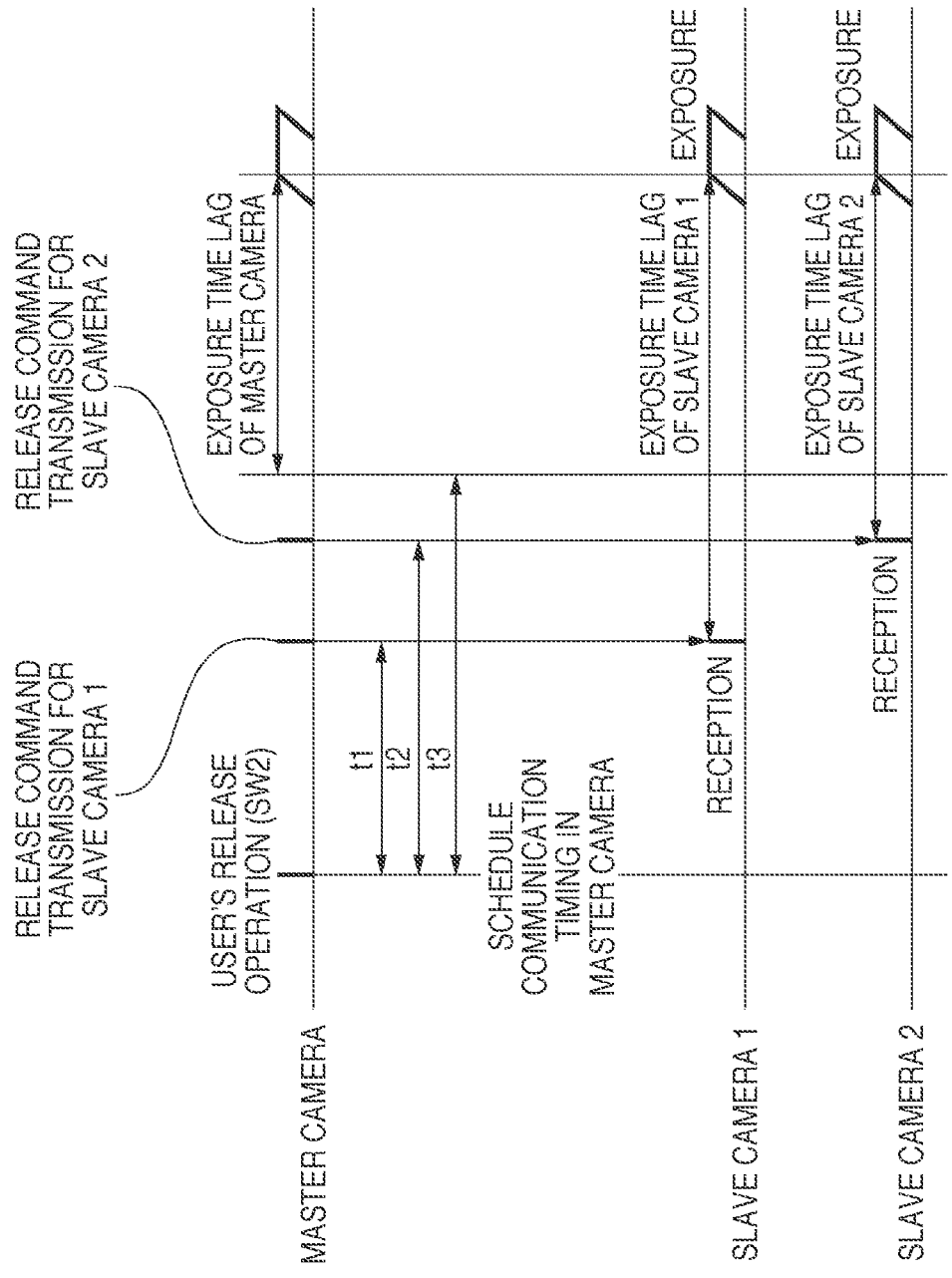
FIG. 4 is a timing chart which exemplifies a collaborative shooting operation between a master camera and slave cameras in a synchronous shooting mode.

In FIG. 4, when a user presses a full stroke of the release switch on the master camera, a SW2 signal is generated, and a collaborative shooting operation sequence in a synchronous shooting mode begins. When a SW2 signal is detected, the master camera determines ultimate exposure start timing, taking into consideration of the delay time information of the slave cameras 1 and 2, delay time information of the master camera, and communication timing of the wireless communication circuit 116. Herein, since the exposure time lag of the slave camera 1 is the longest among the three cameras, timing at which the slave camera 1 can reliably start the exposure is made the benchmark exposure-start timing. Also, communication timing in wireless communication must be taken into account. In wireless communication in which the same frequency band is used in transmission and reception, ordinarily, half-duplex communication is performed. Since transmission/reception timing is time-shared, transmission is not always possible. Moreover, since beacon transmission timing has been set in a wireless LAN, packet transmission timing is further limited. The master camera needs to perform scheduling by selecting, from the limited transmittable timing, the most appropriate communication timing for transmitting a release command to each of the slave cameras.

When exposure start timing is determined, the master camera schedules the most appropriate communication timing (t1 and t2) for transmitting a release command, taking the exposure time lag of the two slave cameras into account. Simultaneously, the master camera determines its own exposure start timing (t3). More specifically, the master camera controls at least one of the exposure start timing of its own and release command transmission timing based on the delay time information of the master camera and the two slave cameras. When communication timing and exposure start timing are determined, the timing information t1, t2, and t3 are set in the timing circuit 114, and the timing circuit 114 starts a timing operation. When each of the set timing elapses, the timing circuit 114 outputs an interruption signal to the camera microcomputer 109.

The camera microcomputer 109 sets a release command in advance in the wireless communication circuit 116. FIG. 5A exemplifies a packet configuration of a release command. In the synchronous shooting in FIG. 4, the first camera to transmit a release command is the slave camera 1. Therefore, an address of the slave camera 1 is inputted in the transmission destination information section in FIG. 5B. When the camera microcomputer 109 receives an interruption signal from the timing circuit 114, the camera microcomputer 109 begins an operation of the wireless communication circuit 116. The wireless communication circuit 116 transmits the release command which has been set in advance to the slave camera 1. When the release command is received, the slave camera 1 starts an exposure sequence in accordance with the release command.

Similarly, when the slave camera 2 reaches the communication timing t2 for release command transmission, the timing circuit 114 outputs an interruption signal to the camera microcomputer 109, and the camera microcomputer 109 begins an operation of the wireless communication circuit 116. The wireless communication circuit 116 transmits the release command which has been set in advance to the slave camera 2. When the release command is received, the slave camera 2 starts an exposure sequence in accordance with the release command.

Furthermore, when the master camera reaches the exposure start timing t3, the timing circuit 114 outputs an interruption signal to the camera microcomputer 109, and the camera microcomputer 109 begins an exposure sequence of the master camera.

The slave cameras 1 and 2 execute a series of exposure sequences based on the delay time information which has been transmitted in advance to the master camera. Also, the master camera executes an exposure sequence based on the delay time information acquired at the time of scheduling. Accordingly, the three cameras can ultimately start exposure at the same timing despite the different exposure time lag of each camera.

FIG. 6 exemplifies respective operation timing of the master camera and the slave cameras in the synchronous shooting mode, as similar to FIG. 4. The difference between FIG. 4 and FIG. 6 is in that the master camera transmits a release command to a plurality of slave cameras by single transmission operation. FIG. 5B shows a packet configuration of the release command in this case. Both the slave cameras 1 and 2 are designated as the transmission destination information in FIG. 5B, making a multicast packet.

Similarly to FIG. 4, when the master camera detects a SW2 signal which has been generated in response to a user's release switch operation, the master camera schedules the communication timing t2 for the slave cameras and the exposure start timing t1 for the master camera. The master camera begins an operation of the timing circuit 114 and wireless communication circuit 116 at the timing of user's release switch operation, and transmits a release command to the two slave cameras at the timing t2.

When a release command is received, the slave camera 1 reads the exposure timing information. In this example, since the release command transmission timing is determined based on the delay time information of the slave camera 1 as a benchmark, the exposure time lag of the slave camera 1 matches the exposure timing information. Therefore, the slave camera 1 begins a series of exposure sequences upon release command reception.

Similarly, when a release command is received, the slave camera 2 reads the exposure timing information. In the slave camera 2, received exposure timing has a larger value than the exposure time lag of the slave camera 2. Therefore, if an exposure sequence begins immediately upon release command reception, exposure cannot be performed at desired timing. For this reason, waiting time corresponding to a difference between the exposure timing and exposure time lag needs to be inserted.

Referring to FIG. 1, the slave camera 2 also comprises the timing circuit 114. When the slave camera 2 receives a release command from the master camera, the slave camera 2 sets a difference between the exposure timing information and the exposure time lag of the slave camera 2 in the timing circuit 114, and starts timing. When the set time elapses, the timing circuit 114 outputs an interruption signal to the image processing unit 117. When the interruption signal is received, the image processing unit 117 starts a series of exposure sequences.

By virtue of the above-described control method, release command transmission timing can be decided with a certain degree of freedom. Even in a communication method using a wireless LAN in which transmission timing cannot freely be decided, a release command can be transmitted at transmittable timing, and a transmission timing difference can be compensated by adding or subtracting the difference to or from the exposure timing information. The slave camera only needs to start an exposure sequence in accordance with the exposure timing information.

Note that, in place of the above-described waiting time, reference time which serves as a benchmark of exposure-start timing may be set, and the set reference time may be transmitted to the two slave cameras as exposure timing information.

As has been set forth above, three cameras can respectively start the exposure sequence at appropriate timing and ultimately begin exposure at the same timing.

According to the above-described collaborative shooting in a synchronous shooting mode, even if the type of cameras or shooting conditions of the cameras are different in a system in which a plurality of cameras are communicatably connected through a linking device, such as a wireless LAN, exposure can be started at the same timing with high precision. As a result, it is possible to realize a system which can meet user's sophisticated requirements, such as shooting an object's momentary expression from different angles.

<Collaborative Shooting in Continuous Shooting Mode>

Next, a collaborative shooting operation in a continuous shooting mode is described with reference to FIG. 7. Currently, there is a camera which is capable of shooting about ten frames per second. According to the continuous shooting mode which will be described below, a plurality of cameras can be controlled at different exposure timing. Therefore, with the use of an increased number of cameras, it is possible to realize high-speed continuous image shooting which can exceed 100 frames per second.

Figure 7:
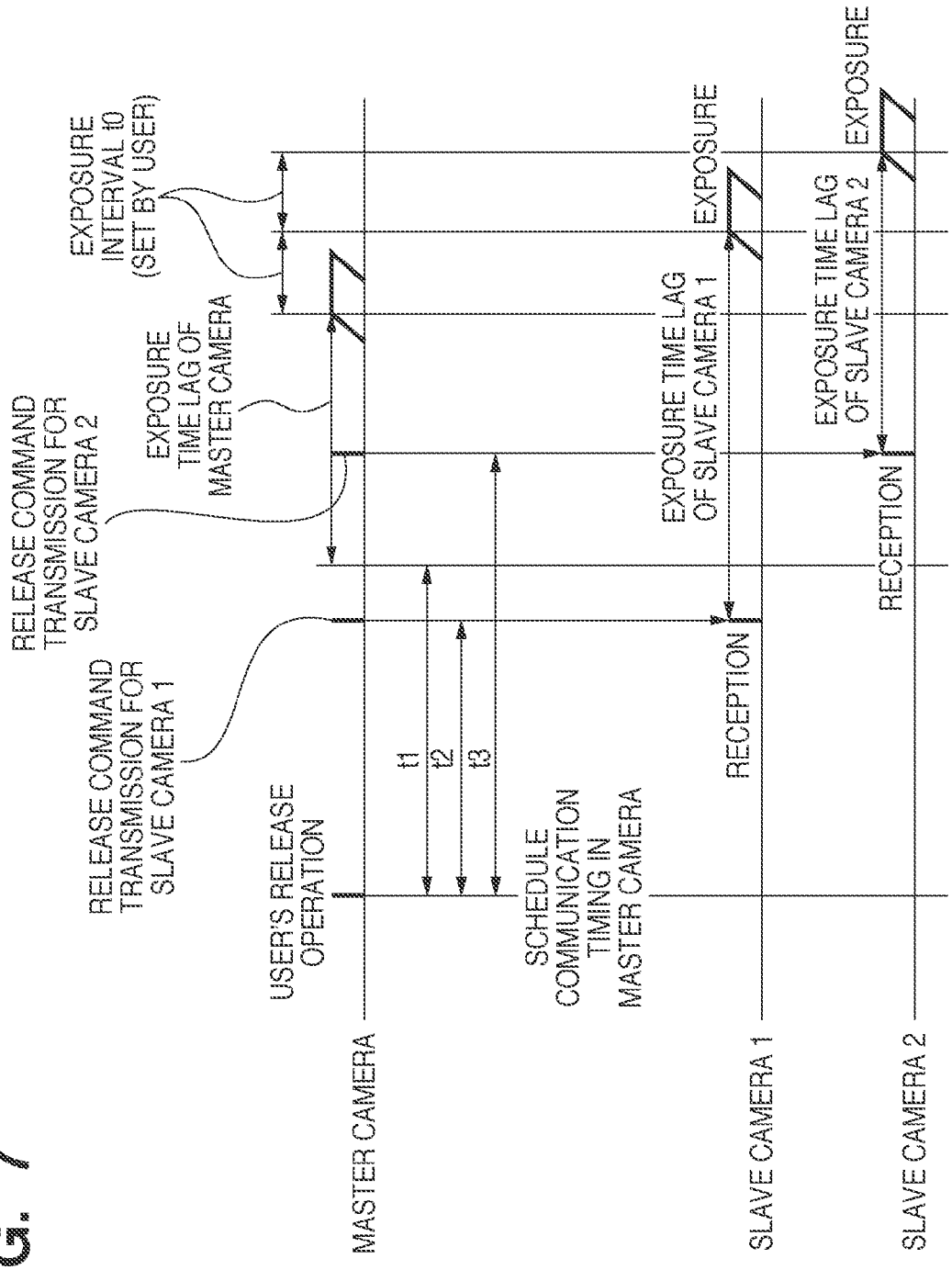
FIG. 7 is a timing chart which exemplifies a collaborative shooting operation between a master camera and slave cameras in a continuous shooting mode.

As similar to the case in FIGS. 4 and 6, assume in FIG. 7 that the master camera has already received delay time information from the slave cameras 1 and 2. Further assume that a continuous shooting mode has been set by a user, and that exposure interval t0, indicative of an interval between the master camera's exposure start timing and the slave camera's exposure start timing, and an image shooting order of the three cameras have been set. The exposure interval t0 does not have to be specified directly by time, but may be specified by a parameter indicative of, for instance, the number of shooting frames per second. In this case, the parameter is converted to time represented as exposure interval t0 in the master camera. Note that, in a case of a synchronous shooting mode, it can be so determined that exposure interval t0=0 is set.

When a user performs a release switch operation of the master camera, a SW2 signal is generated, and a continuous shooting sequence begins. When a SW2 signal is detected, the master camera determines exposure start timing for continuous shooting, taking into consideration of the delay time information of the slave cameras 1 and 2, the delay time information of the master camera itself, communication timing of the wireless communication circuit 116, and exposure interval t0. The master camera performs scheduling by selecting, from the limited transmittable timing, the most appropriate timing for transmitting a release command to each of the slave cameras.

When exposure start timing is determined, the master camera schedules the communication timing (t2 and t3) for transmitting a release command to respective cameras, taking the exposure time lag of the two slave cameras into account. Simultaneously, the master camera determines its own exposure start timing (t1). When each of the timing is determined, the timing information t2, t3, and t1 are set in the timing circuit 114, and the timing circuit 114 starts a timing operation.

Thereafter, as similar to the case of synchronous shooting, when an interruption signal from the timing circuit 114 is received, the camera microcomputer 109 transmits a release command to each of the slave cameras, and also starts an exposure sequence of the master camera itself.

When a release command is received, the slave cameras 1 and 2 start an exposure sequence of each camera in accordance with the delay time information which has been transmitted to the master camera in advance. As a result, the three cameras are able to perform continuous shooting in accordance with the user-set exposure interval t0 and image-shooting order.

According to the above-described collaborative shooting in a continuous shooting mode, even if the type of cameras or conditions of the cameras are different in a system in which a plurality of cameras are communicatably connected, it is possible to perform continuous shooting at exposure timing that is intended by a user. As a result, it is possible to realize a system which can meet user's sophisticated requirements, such as shooting an object's momentary expression from different angles.

[Second Embodiment]

Next, the second embodiment is described with reference to FIG. 8. FIG. 8 exemplifies operation timing of each camera, of which release switch is operated not just once, but continuously. When exposure ends, the slave cameras 1 and 2 transmit the next delay time information to the master camera. The delay time information differs depending on the slave camera's shooting conditions at the time, for instance, AF/AE operation, the state of the lens, an availability of the image buffer, the state of the recording medium and so on. The camera microcomputer 109 in the slave camera determines a shooting condition of the camera at the time, and generates, for the next shooting operation, information indicative of what the time lag is from release command reception to an exposure start, namely, delay time information. When a previous shooting ends, the slave camera transmits the generated delay time information to the master camera as soon as possible in order to maintain the overall system response. If the delay time information can be determined before the previous shooting ends, the delay time information concerning the next shooting operation may be transmitted during the previous shooting operation.

Depending on the state of the slave camera, there is a case that exposure time lag becomes so long that it disturbs continuous shooting. In other words, there is a case that exposure time lag is longer than the time between an exposure of the slave camera and the next exposure of the slave camera in continuous shooting. In this case, the slave camera informs the master camera of a busy state, indicating that the slave camera is unable to execute continuous shooting, instead of transmitting delay time information. Furthermore, the slave camera also informs the master camera of information, indicating whether or not a previous release command has been processed normally.

The master camera receives, from each slave camera, delay time information concerning the next shooting, information indicating that the slave camera cannot execute continuous shooting, and/or information indicating whether or not a previous release command has been processed normally. Thereafter, the master camera again schedules exposure timing and release command transmission timing of respective cameras in order to have the slave cameras execute the next continuous shooting.

Based on the scheduled result, the master camera transmits a release command to the camera which performs the next shooting at appropriate timing. Since the master camera knows the camera's image shooting order, informing the slave camera of a continuous shooting number or a file number along with release command transmission will later facilitate easy file management of the series of continuously shot images.

As has been described above, according to the present embodiment, even in a case where a slave camera's shooting condition changes, since the master camera knows the timing at which each slave camera can start exposure, it is possible to perform image shooting at appropriate timing by properly controlling an exposure operation of all the cameras. Furthermore, it is possible to avoid a situation in which exposure timing gradually becomes off among the cameras and the file numbers go out of order and lose continuity, or a situation in which frame intervals become inconstant and the shot images become awkward when they are displayed in order.

[Third Embodiment]

Next, the third embodiment is described with reference to FIGS. 9A and 9B. Since an exposure time lag value largely depends on a camera's shooting condition, if the slave camera's shooting condition is known, it is possible for the master camera to calculate an exposure time lag value of the slave camera. While slave camera's exposure time lag is generated by the slave camera in the second embodiment, in the present embodiment, delay time information of the slave camera is generated by the master camera. Note that, unless specifically stated otherwise, the following processing is realized by executing control in accordance with an input signal from respective circuits or a program of firmware stored in the non-volatile memory 124 by the camera microcomputer 109 of the master camera.

FIGS. 9A and 9B exemplify flowcharts of a collaborative shooting operation according to the present embodiment. FIG. 9A exemplifies a master camera's operation in a case where a shooting condition determined by a slave camera is transmitted to the master camera. FIG. 9B exemplifies a master camera's operation in a case where a shooting condition of a slave camera is determined by the master camera. In either case, a slave camera transmits to a master camera, a table for calculating exposure time lag based on predetermined shooting conditions. This table indicates delay time information corresponding to a combination of shooting conditions, for instance, a f-stop value, shutter speed, an ISO value, and so on. The master camera can generate delay time information by referring to the table based on the slave camera's shooting conditions.

In FIG. 9A, when a release switch operation is performed by a user and a SW2 signal is detected (S121), the master camera receives, from the slave camera, information concerning shooting conditions, such as a f-stop value, shutter speed, an ISO value, and so on (S122). Next, based on the received shooting conditions and the table which has been received in advance, the camera microcomputer 109 of the master camera generates delay time information concerning the next image shooting (S123).

Next, the master camera schedules exposure timing of all the cameras, including the master camera, based on the received delay time information, and calculates exposure timing and communication timing of each slave camera (S124). Based on the calculation result in S124, the master camera generates a release packet for each slave camera (S125). Then, the master camera transmits the release packet in a communication sequence corresponding to the shooting mode set by a user, and the master camera itself also starts an exposure sequence, thereby beginning the collaborative shooting (S126). When the exposure operation of each slave camera ends, the master camera again receives the shooting conditions of each slave camera, and prepares for the next shooting operation (detection of a SW2 signal) (S127). When a SW2 signal is no longer detected in S128 (when predetermined time elapses without detection of a SW2 signal), the collaborative shooting operation ends.

In FIG. 9B, when a release switch operation is performed by a user and a SW2 signal is detected (S131), the master camera determines shooting conditions of each slave camera, such as a f-stop value, shutter speed, an ISO value, and so on (S132). By having a master camera determine not only communication timing and exposure timing of slave cameras but also shooting conditions of the slave cameras, the master camera can control the overall system more intensively, and also a user can realize a more sophisticated image shooting sequence.

Next, based on the shooting conditions determined in S132 and the table which has been received in advance, the master camera generates delay time information concerning the next image shooting (S133), and transmits the calculated shooting conditions to each slave camera (S134). Each slave camera performs an operation in accordance with the shooting conditions transmitted by the master camera.

Thereafter, the master camera schedules exposure timing of all the cameras, including the master camera, based on the delay time information calculated in S133, and calculates exposure timing and communication timing of each slave camera (S135). Based on the calculation result in S135, the master camera generates a release packet for each slave camera (S136). Then, the master camera transmits the release packet in a communication sequence corresponding to the shooting mode set by a user, and the master camera itself also starts an exposure sequence, thereby beginning the collaborative shooting (S137). When a SW2 signal is no longer detected in S138 (when predetermined time elapses without detection of a SW2 signal), the collaborative shooting operation ends.

As has been described above, the present embodiment achieves an effect similar to that of the first and second embodiments by calculating delay time information by the master camera, instead of receiving delay time information from a slave camera. Furthermore, since a master camera determines shooting conditions of a slave camera, a user is able to achieve more sophisticated and detailed control of the overall system, and therefore, it is possible to reflect user's intention in an image shooting operation.

Note that the similar effect can be attained also with a configuration which is a combination of the first and second embodiments.

[Other Embodiments]

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-035427, filed Feb. 19, 2010, which is hereby incorporated by reference herein in its entirety.

What is claimed is:

1. An image sensing apparatus which is communicable with another image sensing apparatus, comprising:
    a transmission unit configured to transmit an instruction signal, which instructs a start of exposure to said another image sensing apparatus;
    an acquisition unit configured to acquire delay time information of said another image sensing apparatus, indicative of delay time from reception of the instruction signal transmitted by said transmission unit to the start of exposure of said another image sensing apparatus; and
    a control unit configured to control at least one of exposure-start timing of the image sensing apparatus itself and transmission timing of the instruction signal, which is transmitted by said transmission unit, based on the delay time information acquired by said acquisition unit,
    wherein said acquisition unit acquires the delay time information by generating the delay time information based on a shooting condition of said another image sensing apparatus.

2. The image sensing apparatus according to claim 1, wherein said acquisition unit acquires, from said another image sensing apparatus, information concerning the shooting condition of said another image sensing apparatus and generates the delay time information.

3. A communication apparatus which is communicable with another image sensing apparatus, comprising:
    a transmission unit configured to transmit an instruction signal, which instructs a start of exposure to said another image sensing apparatus, said instruction signal including information indicative of waiting time for having said another image sensing apparatus wait for the start of an exposure preparation operation after the instruction signal is received;
    an acquisition unit configured to acquire delay time information of said another image sensing apparatus, indicative of delay time from the start of the exposure preparation operation to the start of exposure of said another image sensing apparatus; and
    a control unit configured to control the waiting time based on the delay time information acquired by said acquisition unit,
    wherein said acquisition unit acquires the delay time information by generating the delay time information based on a shooting condition of said another image sensing apparatus.

4. A communication apparatus which is communicable with another image sensing apparatus, comprising:
    a transmission unit configured to transmit an instruction signal, which instructs a start of exposure to said another image sensing apparatus, said instruction signal including information indicative of reference time which serves as a benchmark of the start of exposure;
    an acquisition unit configured to acquire delay time information of said another image sensing apparatus, indicative of delay time from the start of an exposure preparation operation to the start of exposure of said another image sensing apparatus; and
    a control unit configured to control the reference time based on the delay time information acquired by said acquisition unit,
    wherein said acquisition unit acquires the delay time information by generating the delay time information based on a shooting condition of said another image sensing apparatus.

5. A communication apparatus which is communicable with an image sensing apparatus, comprising:
    a transmission unit configured to transmit an instruction signal, which instructs a start of exposure to the image sensing apparatus;
    an acquisition unit configured to acquire delay time information of the image sensing apparatus, indicative of delay time from reception of the instruction signal transmitted by the transmission unit to the start of exposure of the image sensing apparatus; and
    a control unit configured to control transmission timing of the instruction signal, which is transmitted by the transmission unit, based on the delay time information acquired by the acquisition unit,
    wherein said acquisition unit acquires the delay time information by generating the delay time information based on a shooting condition of said image sensing apparatus.

6. The communication apparatus according to claim 3, wherein said acquisition unit acquires, from said another image sensing apparatus, information concerning a shooting condition of said another image sensing apparatus and generates the delay time information.

7. The communication apparatus according to claim 4, wherein said acquisition unit acquires, from said another image sensing apparatus, information concerning a shooting condition of said another image sensing apparatus and generates the delay time information.

8. The communication apparatus according to claim 5, wherein said acquisition unit acquires, from said image sensing apparatus, information concerning a shooting condition of said image sensing apparatus and generates the delay time information.

9. An image sensing apparatus which is communicable with another image sensing apparatus, comprising:
a transmission unit configured to transmit an instruction signal, which instructs a start of exposure to said another image sensing apparatus;
an acquisition unit configured to acquire delay time information of said another image sensing apparatus, indicative of delay time from reception of the instruction signal transmitted by said transmission unit to the start of exposure of said another image sensing apparatus; and
a control unit configured to control at least one of exposure-start timing of the image sensing apparatus itself and transmission timing of the instruction signal, which is transmitted by said transmission unit, based on the delay time information acquired by said acquisition unit,
wherein said transmission unit transmits a signal which requests said another image sensing apparatus of the delay time information, and
said acquisition unit acquires the delay time information by receiving a signal from said another image sensing apparatus in response to the signal which has requested the delay time information.

10. An image sensing apparatus which is communicable with another image sensing apparatus, comprising:
a transmission unit configured to transmit an instruction signal, which instructs a start of exposure to said another image sensing apparatus, said instruction signal including information indicative of waiting time for having said another image sensing apparatus wait for the start of an exposure preparation operation after the instruction signal is received;
an acquisition unit configured to acquire delay time information of said another image sensing apparatus, indicative of delay time from the start of the exposure preparation operation to the start of exposure of said another image sensing apparatus; and
a control unit configured to control the waiting time based on the delay time information acquired by said acquisition unit,
wherein said transmission unit transmits a signal which requests said another image sensing apparatus of the delay time information, and
said acquisition unit acquires the delay time information by receiving a signal from said another image sensing apparatus in response to the signal which has requested the delay time information.

11. An image sensing apparatus which is communicable with another image sensing apparatus, comprising:
a transmission unit configured to transmit an instruction signal, which instructs a start of exposure to said another image sensing apparatus, said instruction signal including information indicative of reference time which serves as a benchmark of the start of exposure;
an acquisition unit configured to acquire delay time information of said another image sensing apparatus, indicative of delay time from the start of an exposure preparation operation to the start of exposure of said another image sensing apparatus; and
a control unit configured to control the reference time based on the delay time information acquired by said acquisition unit,
wherein said transmission unit transmits a signal which requests said another image sensing apparatus of the delay time information, and
said acquisition unit acquires the delay time information by receiving a signal from said another image sensing apparatus in response to the signal which has requested the delay time information.

12. A communication apparatus which is communicable with an image sensing apparatus, comprising:
a transmission unit configured to transmit an instruction signal, which instructs a start of exposure to the image sensing apparatus;
an acquisition unit configured to acquire delay time information of the image sensing apparatus, indicative of delay time from reception of the instruction signal transmitted by the transmission unit to the start of exposure of the image sensing apparatus; and
a control unit configured to control transmission timing of the instruction signal, which is transmitted by the transmission unit, based on the delay time information acquired by the acquisition unit,
wherein said transmission unit transmits a signal which requests said image sensing apparatus of the delay time information, and
said acquisition unit acquires the delay time information by receiving a signal from said image sensing apparatus in response to the signal which has requested the delay time information.

* * * * *